United States Patent
Johnson et al.

(10) Patent No.: US 7,497,459 B2
(45) Date of Patent: Mar. 3, 2009

(54) CABLE ACTUATED PIN LATCHING MECHANISM WITH AUTOMATIC CABLE TENSION AND PIN RELEASE FEATURES

(75) Inventors: Orlin W. Johnson, Geneseo, IL (US);
William L. Cooksey, Geneseo, IL (US);
Michael Tomtene, Saskatoon (CA);
Mark S. Epperly, Sherrard, IL (US);
Neal R. Rosengren, Geneseo, IL (US)

(73) Assignee: CNH America LLC, New Holland, PA (US)

( * ) Notice: Subject to any disclaimer, the term of this patent is extended or adjusted under 35 U.S.C. 154(b) by 36 days.

(21) Appl. No.: 11/712,048

(22) Filed: Feb. 28, 2007

(65) Prior Publication Data
US 2008/0205978 A1    Aug. 28, 2008

(51) Int. Cl.
*B60D 1/02* (2006.01)
(52) U.S. Cl. ...................................... 280/515
(58) Field of Classification Search ................. 280/515, 280/504, 508, 509, 510, 400; 56/15.6
See application file for complete search history.

(56) References Cited

U.S. PATENT DOCUMENTS

| | | | | |
|---|---|---|---|---|
| 2,130,892 A | * | 9/1938 | Morphet | 477/170 |
| 2,695,071 A | | 11/1954 | Hupp | 180/19 |
| 2,787,472 A | * | 4/1957 | Foggiano et al. | 280/5.28 |
| 2,824,463 A | * | 2/1958 | Gleasman et al. | 74/489 |
| 2,930,940 A | * | 3/1960 | Trumpler | 361/622 |
| 3,021,009 A | | 2/1962 | Scott | 209/394 |
| 3,412,332 A | * | 11/1968 | Schumann, Jr. et al. | 324/157 |
| 3,727,943 A | * | 4/1973 | Augunas et al. | 280/803 |
| 3,958,399 A | * | 5/1976 | Schoeneberger | 56/15.8 |
| 4,227,363 A | * | 10/1980 | Kerber et al. | 56/10.2 E |
| 4,253,295 A | * | 3/1981 | Knepper | 56/15.6 |
| 4,266,391 A | | 5/1981 | McDuffie et al. | 56/14.5 |
| 4,280,317 A | * | 7/1981 | Lindblom et al. | 56/15.6 |
| 4,532,756 A | | 8/1985 | Merkel | 56/202 |
| 4,538,625 A | | 9/1985 | Fortune et al. | 130/27 JT |
| 4,641,490 A | * | 2/1987 | Wynn et al. | 56/10.2 E |
| 4,897,072 A | * | 1/1990 | Bestland | 460/99 |

(Continued)

FOREIGN PATENT DOCUMENTS

JP    2001245526 A  *  9/2001

(Continued)

OTHER PUBLICATIONS

Ralston, et al. U.S. Defensive Publication No. T101,206, dated Nov. 3, 1981—US.

*Primary Examiner*—Árpád Fábián-Kovács
(74) *Attorney, Agent, or Firm*—Michael C. Harms; John William Stader; Patrick M. Sheldrake

(57) ABSTRACT

A cable actuated pin latching mechanism adapted for releasably connecting a header to a feeder of a combine, which automatically maintains predetermined tension conditions on the cable during normal latching and unlatching operation, and when an actuator of the mechanism is held in an unlatch position with the latch pin stuck or restrained, applies and maintains a tension force for releasing the pin, for instance, to enable a user to move to the operator cab to operate lift, tilt and/or other controls, as required for freeing the pin.

20 Claims, 9 Drawing Sheets

U.S. PATENT DOCUMENTS

| | | | | |
|---|---|---|---|---|
| 5,358,266 | A | * | 10/1994 | Roth et al. ............... 280/304.1 |
| 6,047,982 | A | * | 4/2000 | McClure et al. ............. 280/515 |
| 6,478,094 | B2 | * | 11/2002 | Alexander et al. .......... 172/439 |
| 6,735,929 | B2 | * | 5/2004 | Watts et al. .................. 56/14.9 |
| 2007/0063565 | A1 | * | 3/2007 | Habedank et al. ........... 297/341 |

FOREIGN PATENT DOCUMENTS

| | | | | |
|---|---|---|---|---|
| JP | 2002262653 | A | * | 9/2002 |
| JP | 2006174737 | A | * | 7/2006 |

* cited by examiner

CABLE ACTUATED PIN LATCHING MECHANISM WITH AUTOMATIC CABLE TENSION AND PIN RELEASE FEATURES

TECHNICAL FIELD

This invention relates generally to a cable actuated pin latching mechanism for releasably connecting components together, which mechanism is particularly adapted for locking a header to a feeder or other support structure of an agricultural combine, and which automatically maintains predetermined tension conditions on the cable during normal operation, and applies a tension force for releasing the latching pin when stuck.

BACKGROUND ART

Work machines, such as agricultural combines, often include removable components or attachments, such as a header for harvesting crops from a field. For some applications, such components, and headers in particular, are required to be installed and removed at isolated locations such as the boundary regions of large agricultural fields, often by a person working alone. In some instances, installation and removal must be done several times a day, for instance, wherein a farming operation comprises several parcels of land to be harvested, and the combine must be driven over roads or lanes from parcel to parcel, with the header removed. Additionally, the header must sometimes be installed and removed on uneven surfaces, which can place loads on the connecting apparatus to make it difficult to connect and disconnect.

Some known mechanisms for locking or latching a header to a feeder of a combine utilize an actuating cable connected between a handle and the latch pin of the mechanism, to enable remote actuation. An advantage of this is that it enables operating latching mechanisms located at the bottom of the feeder from a more convenient location, and operating latches on opposite sides of the feeder from a single location on one side. The known mechanisms typically operate by pushing on the cable to urge a latch pin into a receiver, and pulling on the cable to remove the pin from the receiver. Problems found with this arrangement, however, include that repeated pushing on the cable, particularly when required to force the latch pin into the receiver, weakens the cable over time. Another problem is that when the pin is stuck in the receiver, users sometimes apply tensile forces to the cable to free the pin which exceed the tensile strength of the cable, which can cause breakage thereof. Freeing a sticking pin can require moving the feeder and header, which is typically done using controls in the operator cab of the combine, and can require the user to climb to and from the cab one or more times to do so.

One solution to the cable breakage problem known to be utilized by other manufacturers, is to provide a shear pin between the actuator handle and the cable, which pin will break if subjected to a force some amount less than the tensile strength of the cable. However, a shortcoming of this solution is that if the shear pin is broken, it must be replaced to render the mechanism operable again, and the latch pin will still need to be freed.

Accordingly, what is sought is a cable actuated pin latching mechanism adapted for connecting a header to a feeder of an agricultural combine, which overcomes one or more of the problems and shortcomings set forth above, is simple and reliable in construction and operation, and is advantageous costwise.

SUMMARY OF THE INVENTION

What is disclosed is a cable actuated pin latching mechanism adapted for releasably connecting a header to a feeder of a combine, which overcomes one or more of the problems set forth above, by automatically maintaining predetermined tension conditions on the cable during normal latching and unlatching operation, and when an actuator of the mechanism is held in an unlatch position with the latch pin stuck, applies and maintains a tension force for releasing the pin, to enable a user to move to the operator cab to operate lift, tilt and/or other controls, as required for freeing the latch pin.

According to a preferred embodiment of the invention, the latching mechanism includes a latch pin supported for movement in opposite latching and unlatching directions, and an actuator supported for movement between a latching position and an unlatching position. The mechanism includes an elongate cable having one end portion connected to the latch pin and an opposite end connected to the actuator, a portion of the cable being disposed between the latch pin and the actuator being contained and movable longitudinally within a sheath. The mechanism includes a first biasing element disposed and supported for yieldably exerting a first biasing force in the latching direction against the latch pin and against the cable for applying a tensile loading condition on the cable. When the latch pin is freely movable in the latching direction, movement of the actuator toward the latching position will allow the first biasing element to move the cable to move the latch pin in the latching direction while maintaining the tensile loading condition on the cable. When the latch pin is freely movable in the unlatching direction, movement of the actuator toward the unlatching position will move the cable to move the latch pin in the unlatching direction. The mechanism further includes a second biasing element disposed and supported in cooperation with the sheath such that if the latch pin is displaced in the latching direction and restrained against movement in the unlatching direction, movement of the actuator to the unlatching position will cause the second biasing element to yieldably exert a second biasing force in the unlatching direction against the sheath, the cable and the latch pin.

According to a preferred aspect of the invention, the cable is maintained in tension, as the latch pin is both latched and unlatched, to avoid problems related to compression loading on the cable. As another preferred aspect of the invention, when the pin is stuck in a latched position, for instance, when retained in a pin receptacle or receiver on an element or attachment to be connected to a work machine, the actuator can be moved to and held in the unlatch position, to allow a user or operator to take steps to free the pin, and when freed, the pin will be retracted from the receiver automatically by the second biasing force. This allows the user the ability to leave the actuator and work elsewhere to free the pin.

BRIEF DESCRIPTION OF THE DRAWINGS

FIG. 5A is another enlarged perspective view of the actuator handle of the mechanism in an unlatching position and showing a detent mechanism of the invention;

DETAILED DESCRIPTION OF THE INVENTION

Figure 1:
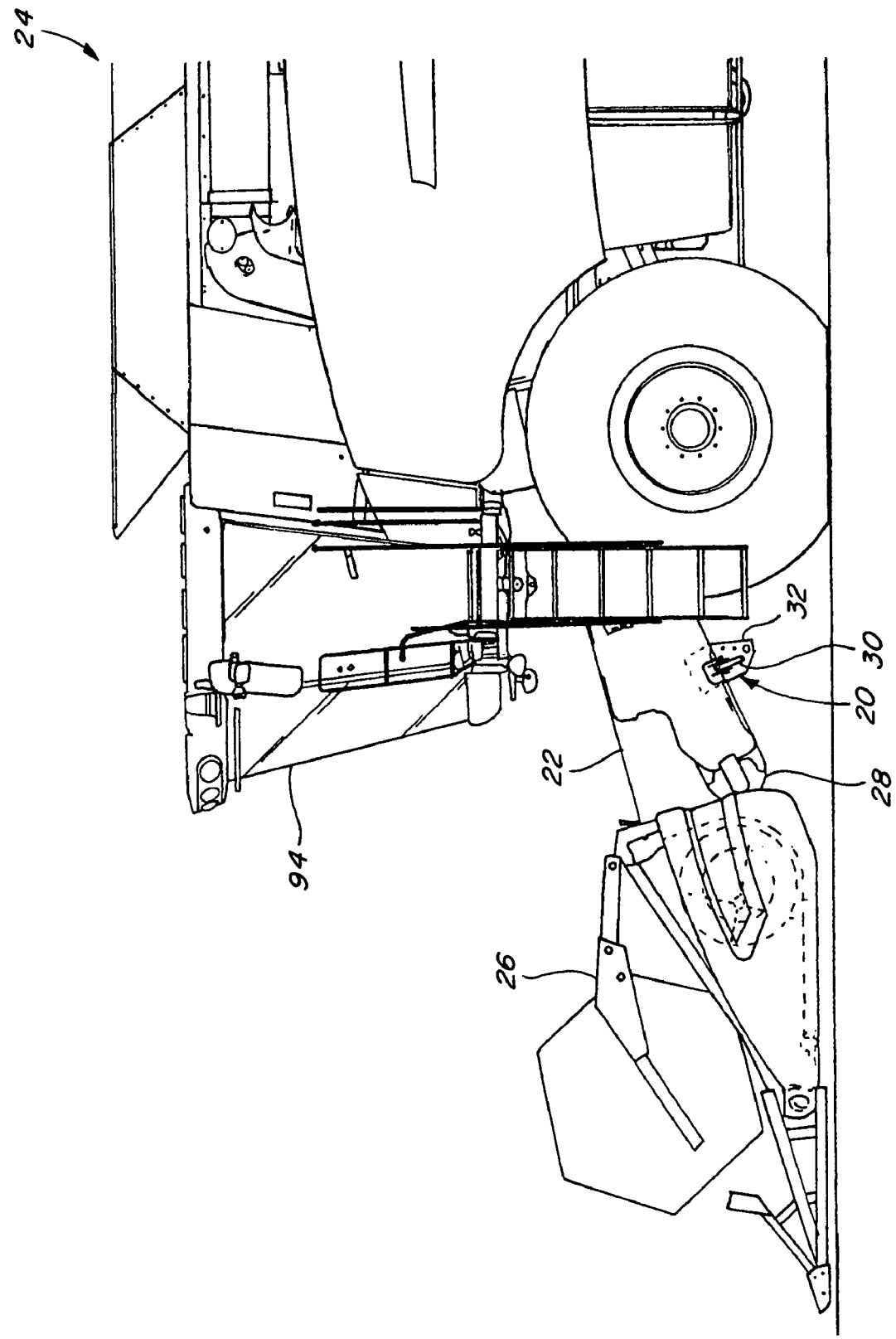
FIG. 1 is a side view of an agricultural combine having a cable actuated pin latching mechanism according to the invention, located on a feeder of the combine and operable for releasably locking a header to the feeder.

Turning now to the drawings, in FIGS. 1, 2, 3 and 4, aspects of a preferred embodiment of a cable actuated pin latching mechanism 20 according to the present invention are shown, like parts being identified by like numerals. Latching mechanism 20 is shown in association with a feeder 22 of a representative agricultural combine 24, and is operable for connecting or locking a header, represented by header 26 to a front end 28 of feeder 22. Feeder 22, combine 24 and header 26 are all of well known, conventional construction. Here, it should be noted that agricultural combine 24 is intended to be illustrative of a wide variety of work machines and applications with which a mechanism including the features of the invention, as represented by mechanism 20, can be used, and therefore, the present invention is not to be interpreted as being limited to the application shown and described herein.

Figure 5:
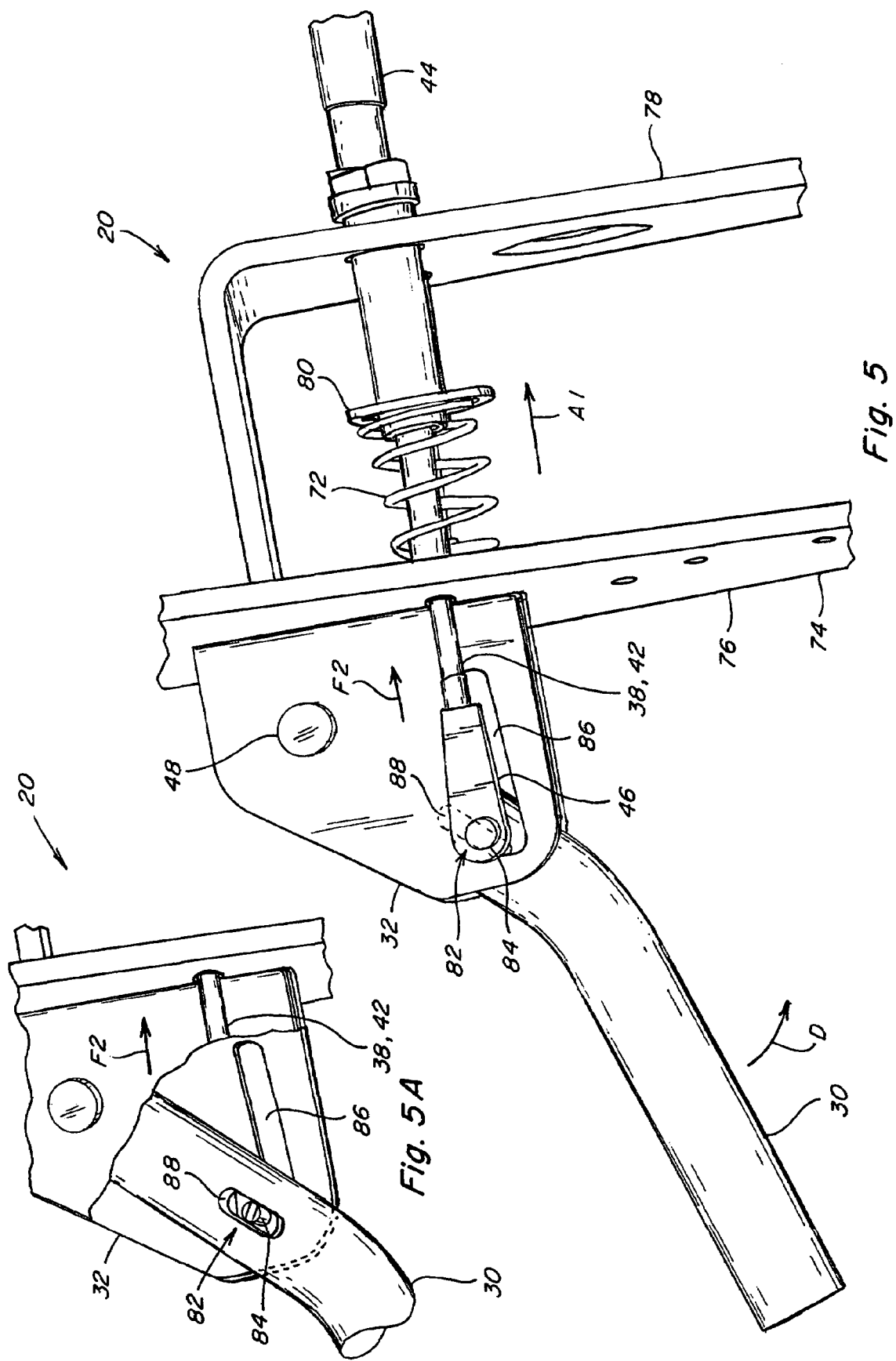
FIG. 5 is an enlarged perspective view of the actuator handle of the mechanism in an unlatching position.

Referring also to FIG. 5, latching mechanism 20 includes an actuator assembly comprising an actuator 30 supported by structure on a side sheet of feeder 22 or other suitable location, which structure here includes a bracket 32 supporting actuator 30 by a pivot pin 48, so as to be manually movable between a latching position (FIG. 2) and an unlatching position (FIG. 5). Latching mechanism 20 includes at least one, and preferably two, latch pin assemblies, each including a latch pin 34, and structure, here including a tubular bracket 36, supporting the latch pin 34 for movement in a latching direction, denoted by respective arrows A, and in an unlatching direction, denoted by respective arrows B, opposite latching direction A, respectively. Latching mechanism 20 additionally preferably includes two cable assemblies, each comprising an elongate cable 38 connecting respectively, to one of the latch pin assemblies. Each cable 38 has a first end portion 40 connected in the manner described below to a respective latch pin 34, an opposite second end portion 42 connected to actuator 30, and an intermediate portion between end portions 40 and 42 contained and movable longitudinally within a sheath 44.

Figure 2:
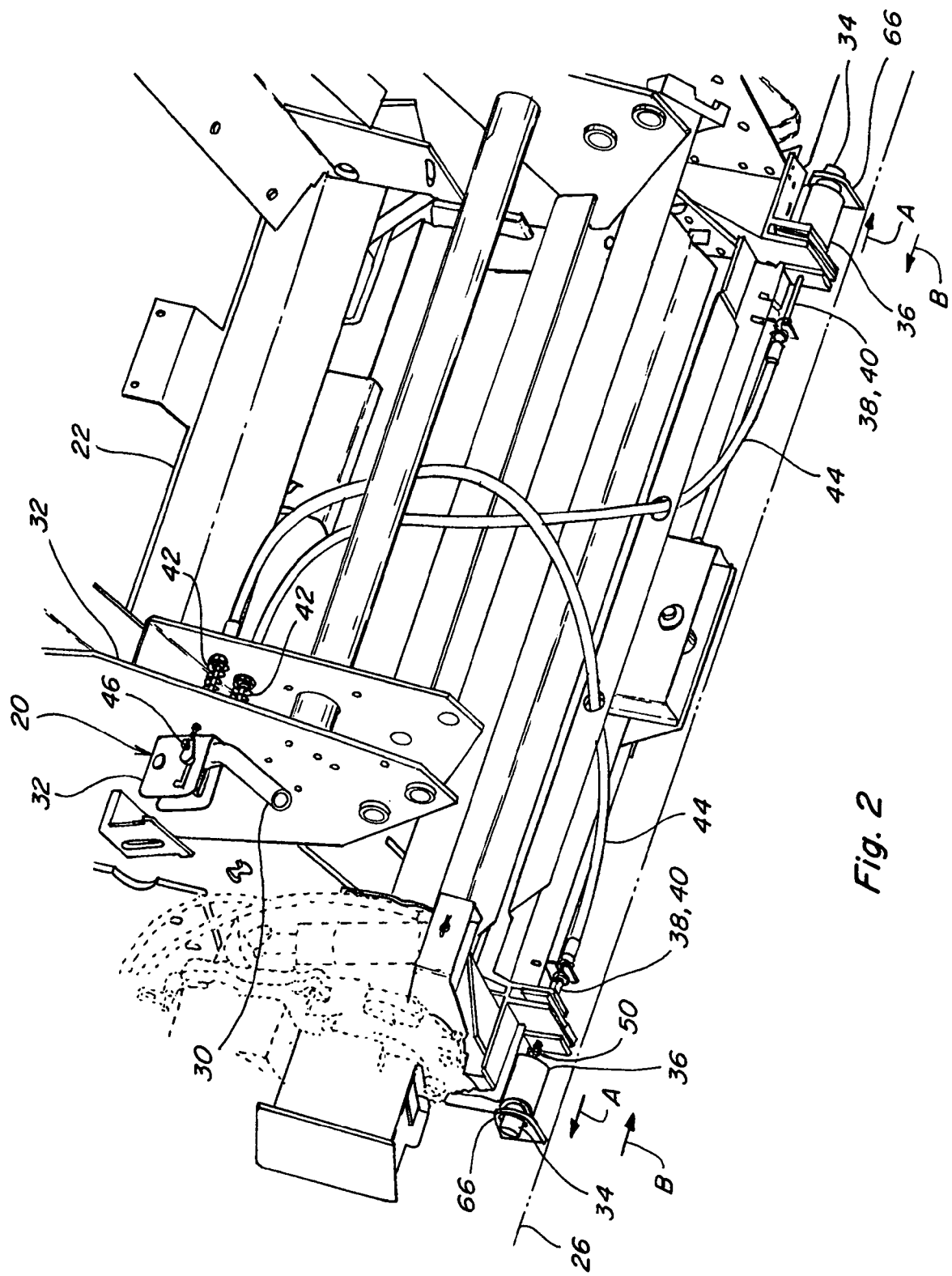
FIG. 2 is a perspective view of the feeder and header of FIG. 1, showing the latching mechanism of the invention.
Figure 3:
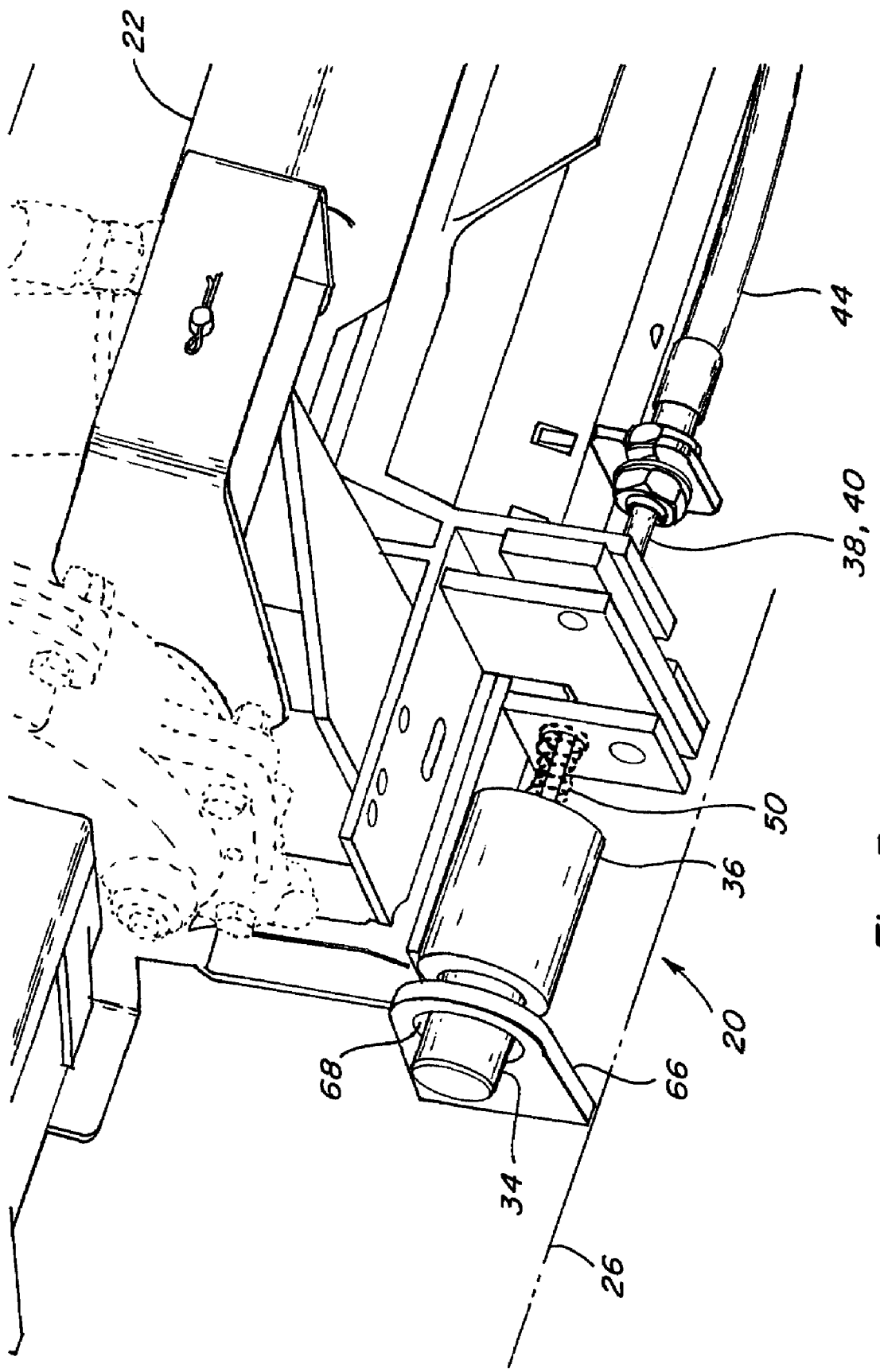
FIG. 3 is an enlarged perspective view of the feeder and the header, showing aspects of the latching mechanism.

End portions 42 of cables 38 are preferably connected to actuator 30 by a clevis 46, or other suitable connector, and sheath 44 is suitably mounted and restrained, as will be explained, such that pivotal or other desired movement of actuator 30 about pin 48 from the unlatching position (FIGS. 1, 2 and 4) as denoted by arrow C in FIG. 4, with pins 34 unrestrained and freely movable, will effect movement or displacement of cables 38 in a direction, denoted by arrow B1, for moving latch pins 34 in the unlatching direction B (FIG. 2), and such that pivotal movement of actuator 30 from the latching position (FIG. 5) in the direction denoted by arrow D, will cause movement or displacement of cables 38 in a direction A1 for moving latch pins 34 in the latching direction A (FIG. 2).

Figure 6:
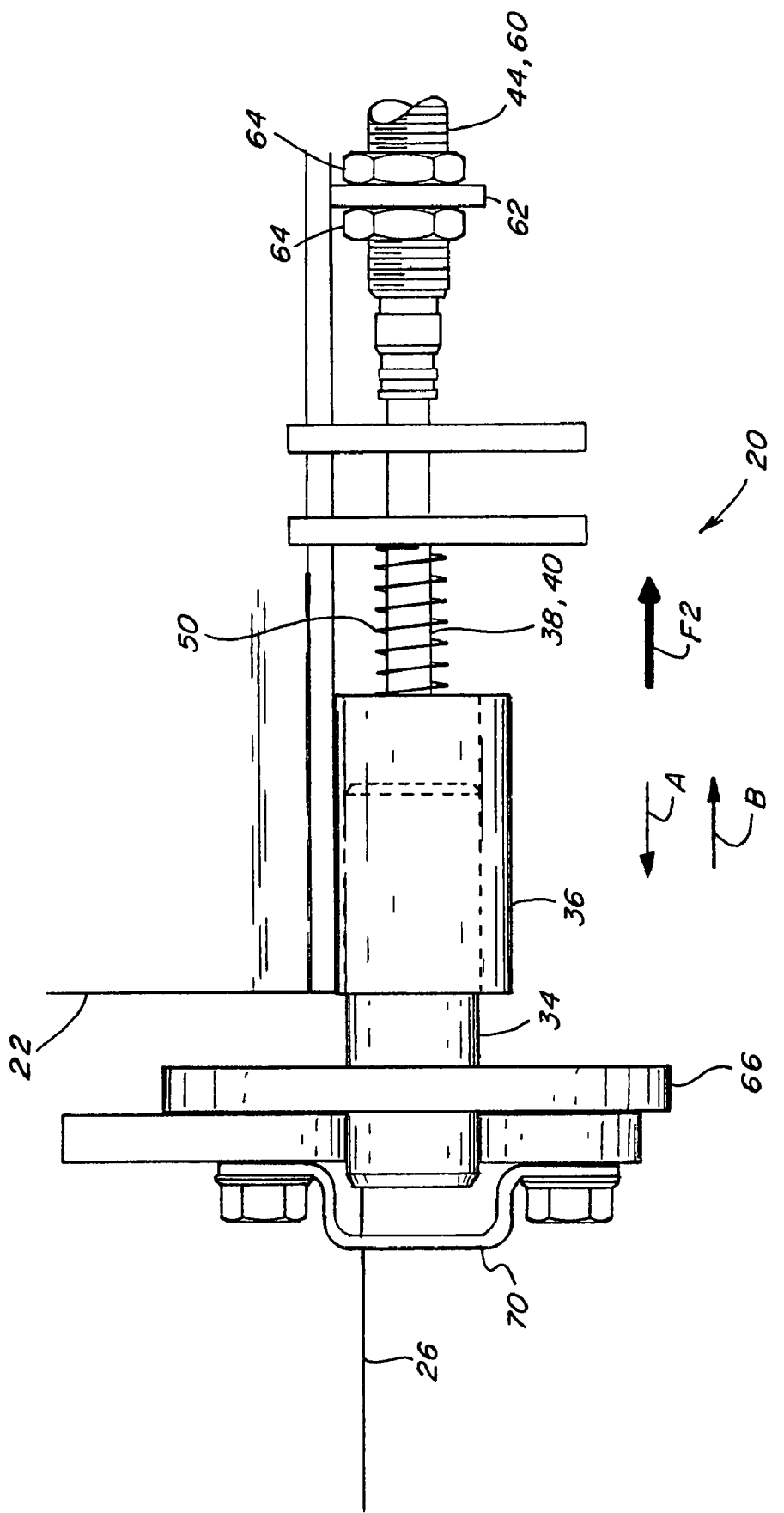
FIG. 6 is an enlarged view of a latch pin assembly and pin receiver of the mechanism, on the feeder and header, respectively, and showing the latch pin received in the receiver.
Figure 6A:
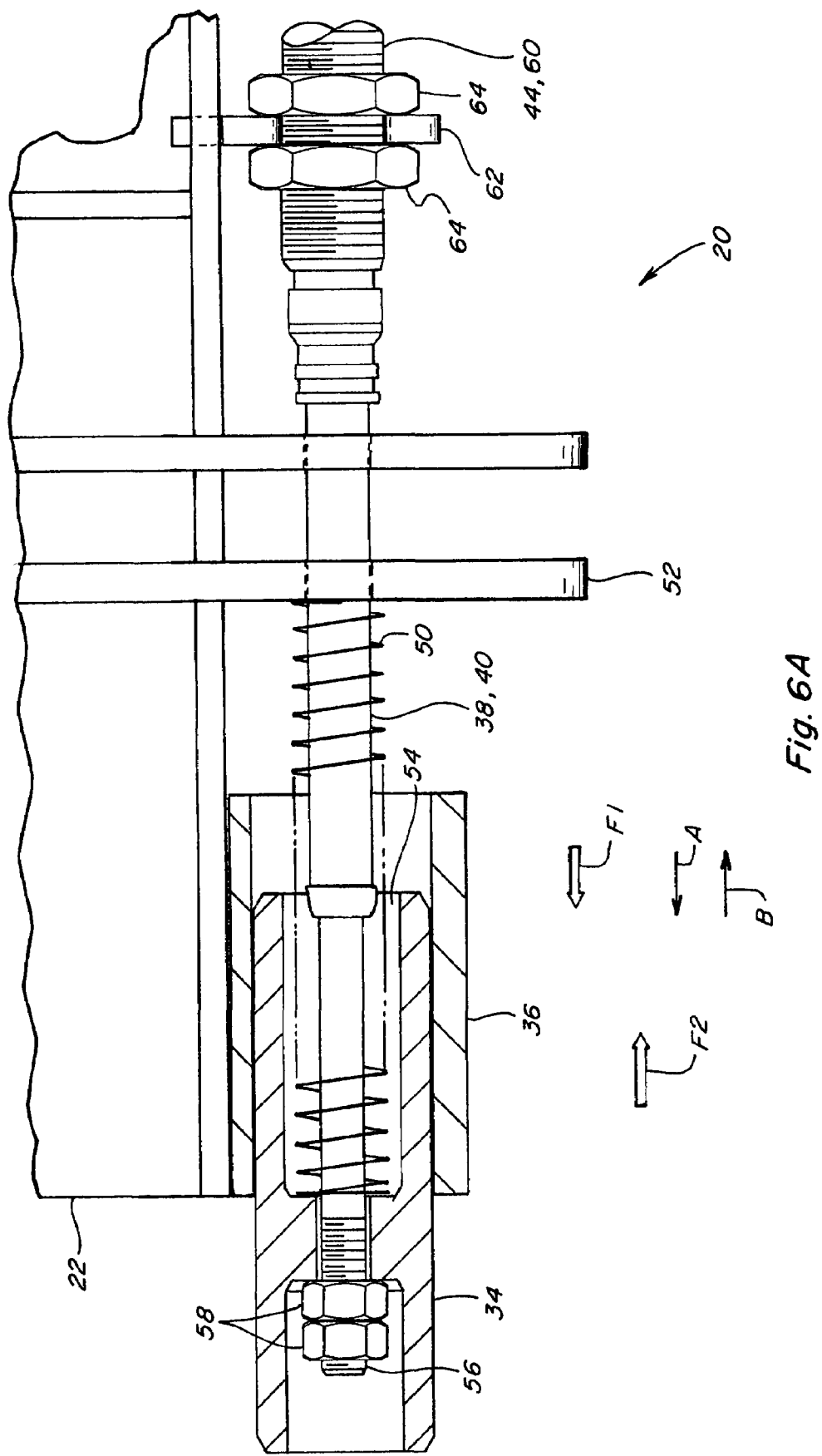
FIG. 6A is another enlarged view of the latch pin assembly, showing internal details thereof.
Figure 7:
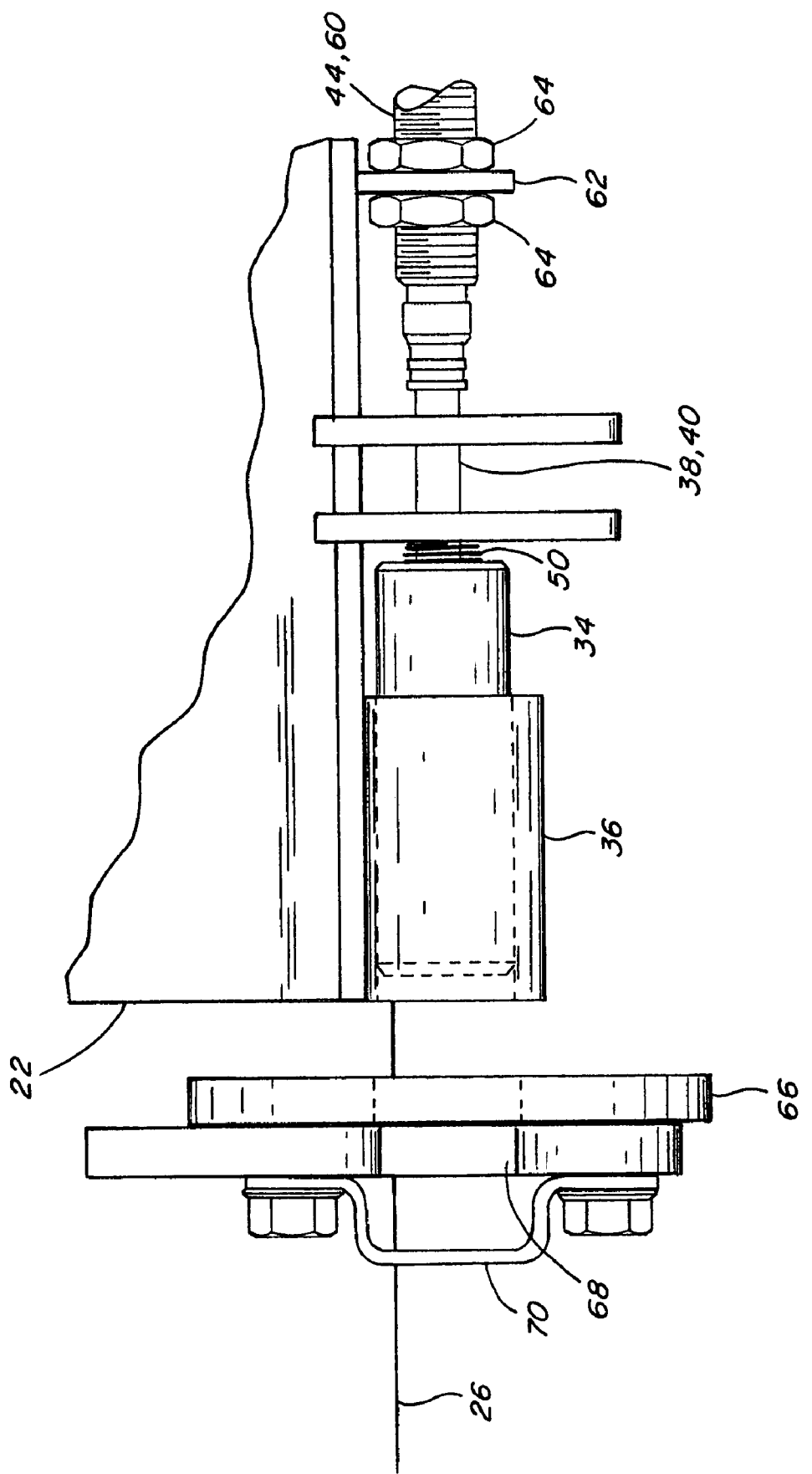
FIG. 7 is an end view of the latch pin assembly and pin receiver of the mechanism, on the feeder and header, respectively, and showing the latch pin withdrawn from the receiver.

Referring in particular to FIG. 2, and also to FIGS. 6, 6A and 7, mechanism 20 includes a first biasing element 50 disposed and supported in connection with each of the respective latch pin assemblies, preferably around first end portion 40 of cable 38. The biasing element 50 is preferably a compression coil spring, one end of which is retained by a bracket 52, and the opposite end of which is received in a cavity 54 within pin 34 and bears against a shoulder therein. End portion 40 of cable 38 has a threaded end 56 which passes through the shoulder in cavity 54, and which is retained by nuts 58 on the opposite side of the shoulder. This enables compressing biasing element 50. Sheath 44 includes a threaded end 60 fixedly mounted to a bracket 62 on feeder 22 by nuts 64, which enables longitudinal movement of pin 34, cable 38, and biasing element 50, relative to the sheath. As a result of this construction, the biasing element 50 associated with each of the latch pin assemblies will yieldably exert a first biasing force, denoted by arrow F1 in FIG. 6A, against the respective latch pin 34 for urging it in its respective latching direction A. Because the opposite end of cable 38 is held by actuator 30, this also applies a tensile loading condition on cables 38, such that, when latch pins 34 are freely movable in latching direction A, movement of actuator 30 in direction C (FIG. 4) toward the latching position, will allow biasing elements 50 to move cables 38 longitudinally within sheaths 44, so as to move latch pins 34 in their latching directions to a latched position (FIGS. 6 and 6A) while maintaining the tensile loading conditions on cables 38. Also, when latch pins 34 are freely movable in their respective unlatching directions B, movement of actuator 30 in direction D toward the unlatching position (FIG. 5) will move cables 38, under the tensile loading condition, to move latch pins 34 in the unlatching directions, to their unlatched positions (FIG. 7). Additionally, if one or both pins 34 is stuck, restrained or otherwise prevented or blocked from movement in latching direction A, cable 38 is movable longitudinally relative to the stuck pin, such that if actuator 30 is moved in the latching direction, cable 38 will be allowed to move in direction A through the stuck pin 34, such that compression loading of the cable is avoided. Configured as shown, when actuator 30 is moved to the unlatching position, first biasing element 50 will be compressed to a greater extent compared to when actuator 30 is in the latching position, and thus will store greater energy compared to when actuator 30 is in its latching position, but in both positions, it is preferred that biasing element 50 be compressed at least somewhat, to maintain a tensile loading condition on cable 38.

Referring more particularly to FIGS. 2, 3, 6 and 7, for the representative application shown and discussed herein, which is the connection of a header, represented by header 26, to the front end of feeder 22, header 26 is illustrated as including a pair of latch pin receivers 66 at predetermined positions for cooperatively receiving latch pins 34 when feeder 22 and header 26 are positioned and aligned in predetermined relation for connection. For this pin receiver configuration, pins 34 are positioned and located adjacent to opposite sides of feeder 22 such that the respective latching directions A for the two pins are opposite directions. Here, it should be understood that it is contemplated that other configurations can be used as desired. Each receiver 66 preferably essentially comprises a bracket or other suitable structure projecting from a bottom edge of header 26, and including a hole 68 therein adapted for receiving a pin 34. Additionally, as illustrated in FIG. 7, receiver 66 includes an optional pin retainer 70 configured for preventing passage of a pin 34 totally through hole 68 in the event of failure of cable 38, and as possibly propelled by the release of stored energy of biasing element 50.

Thus, to reiterate, it should be evident that under normal conditions, that is, with pin 34 freely movable, manual movement of actuator 30 to the latching position, will effect simultaneous insertion of pins 34 disposed adjacent to the opposite sides of feeder 22, into the respective holes 68 of receivers 66 on header 26, for connection of the header to the feeder, with cables 38 maintained in a tensile loading condition. And, in the event that the path of either of pins 34 is blocked, for instance, as a result of misalignment with hole 68, the hole 68 is blocked, or pin 34 is stuck, when actuator 30 is moved to the latching position, cable 38 for the blocked or stuck pin can move through the pin, to avoid compression or loading of the cable 38, and there is sufficient space within the end of pin 34 to accomplish this without the end of the cable itself being driven into an obstruction. Similarly, under normal conditions, movement of actuator 30 to the unlatching position, will effect simultaneous withdrawal of pins 34 from receivers 66, cables 38 still being maintained in tension. However, it is anticipated that, from time to time, one or both pins 34 may be restrained against withdrawal from its receiver 66, or otherwise stuck therein, so as not to be removable using the tensile loading condition that can normally be achieved by manual movement of actuator 30. This can result, for instance, from positioning or orienting the header and feeder at a tilt, so as to resultingly apply a large shear loading condition against one or both pins 34, which load cannot be overcome by the normal tensile loading condition applied manually using actuator 30. It can also result from corrosion or seizing, or damage to a pin 34 and/or receiver 66. As noted above, when this occurs, users have been known to apply forces in excess of the tensile strength of a cable 38 in an attempt to free the stuck pin or pins 34, which has resulted in stretching, weakening, and even breaking of the affected cable. This of course is not desired, as it can result in machine downtime, loss of productivity, and user dissatisfaction.

To avoid the problems just discussed, mechanism 20 additionally utilizes a second biasing elements 72 disposed and supported such that if one or both latch pins 34 is stuck, such as by being restrained, obstructed, seized or the like, movement of actuator 30 to the unlatching position will cause an associated second biasing element 72 to yieldably exert a second biasing force, denoted by arrows F2 in FIGS. 6 and 6A, in the unlatching direction against the affected pin or pins 34. As a result, force F2 is only applied when a pin or pins 34 is stuck, and not when freely movable.

Figure 4:
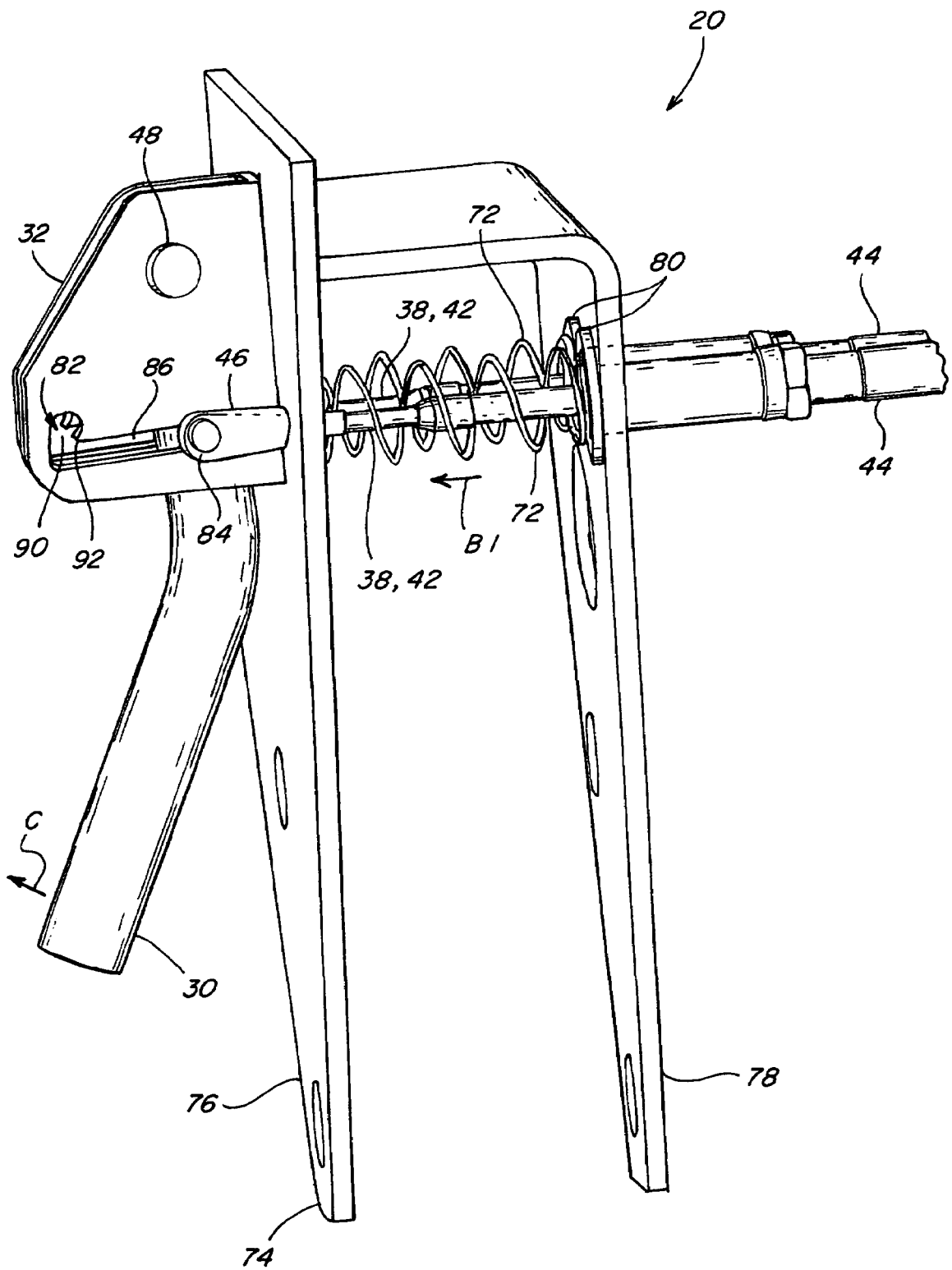
FIG. 4 is an enlarged perspective view of an actuator handle of the mechanism in a latching position.
Figure 8:
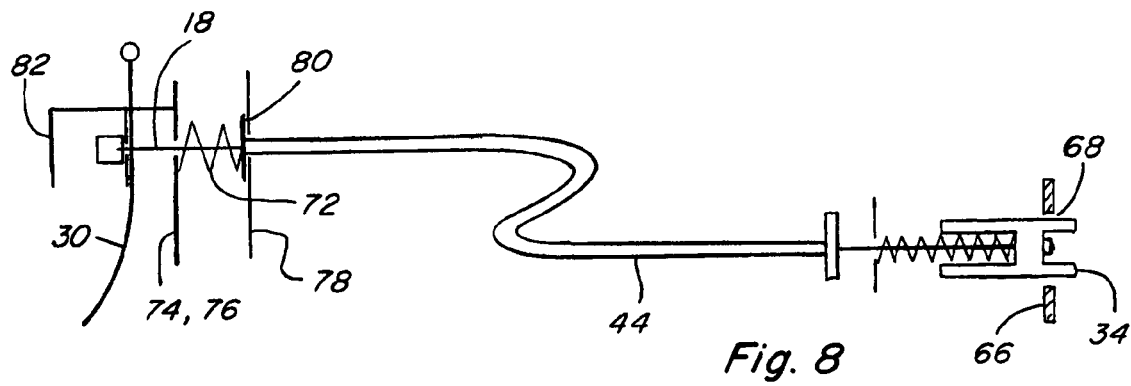
FIG. 8 is a simplified view of aspects of the latch pin assembly, showing the latch pin received in the pin receiver.
Figure 9:
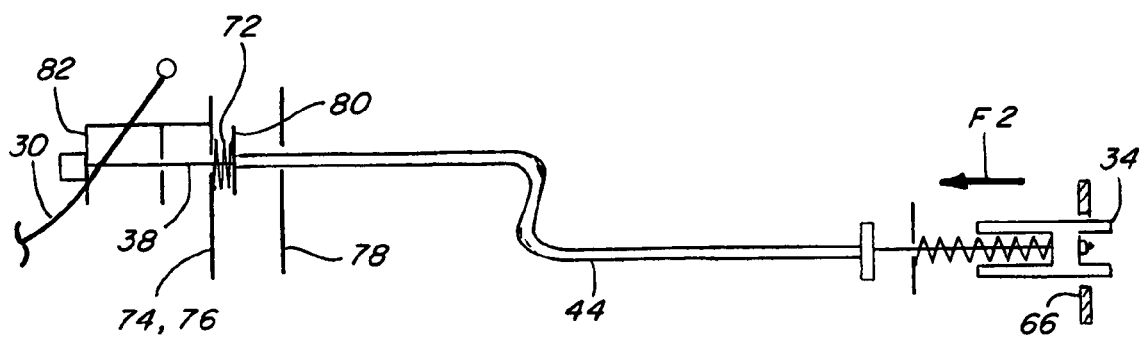
FIG. 9 is another simplified view of the aspects of the latch pin assembly, showing the latch pin stuck in the pin receiver with tension applied to the cable of the mechanism for freeing the pin.
Figure 10:
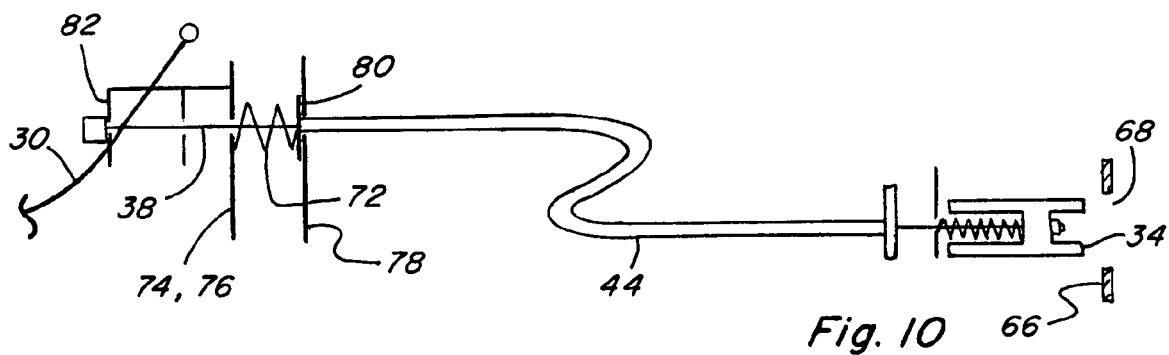
FIG. 10 is another simplified view of the aspects of the latch pin assembly, showing the latch pin freed from the pin receiver.

Referring more particularly to FIGS. 4 and 5, and also to FIGS. 8, 9 and 10, to achieve the above capability, second biasing elements 72 preferably comprise sheath springs disposed around second end portions 42 of cables 38, respectively, and retained between the adjacent end of the associated sheath 44, and a structural element of the actuator assembly. Here, a preferred structural element is a bracket 74 through which the respective cables 38 pass enroute to connection with actuator 30. Bracket 74 is preferably of bifurcated, U-shaped, or other suitable construction, including a first leg 76 on which bracket 32 supporting actuator 30 is mounted, and which retains biasing elements 72 against movement toward actuator 30. A second leg 78 of bracket 74 includes holes therethrough sufficiently large for passage of cables 38 therethrough, respectively, including sheaths 44 thereof. Biasing elements 72 are retained in connection with the respective sheaths 44 by retainers 80 mounted around the ends of the sheaths, which retainers 80 are sized so as not to pass through the holes in legs 78. Biasing elements 72 are compressed between leg 76 and retainers 80 so as to store sufficient energy for holding retainers 80 and thus the ends of sheaths 44 against leg 78, during movements of actuator 30 between the unlatching and latching positions under normal conditions as described above wherein pins 34 are freely movable, for moving cables 38 to move pins 34 between their unlatching and latching positions illustrated in FIGS. 8 and 10.

FIGS. 5 and 9 illustrate operation of biasing element 72 when a pin 34 is, or pins 34 are, stuck, i.e., obstructed, seized, jammed, in a position displaced in the latching direction, for instance, in hole 68 of receiver 66 (FIG. 9), and a force is applied against actuator 30 to move it toward the unlatching position. Biasing element 72 accommodates this, by being resiliently yieldable to a sufficient level of applied force, and sheath 44 has sufficient flexibility and curvature, to allow sheath 44 and cable 18 to move as a unit, with actuator 30. This allows actuator 30 to be moved to the unlatching position, while at the same time biasing element 72 is increasingly compressed to store an increased amount of energy, at least a substantial portion of which is exerted against the stuck pin or pins 34 in the unlatching direction as force F2, through cable 38. Thus, if both pins 34 are stuck the force F2 will be applied to each of them, by the compression of both biasing elements 72. If only one pin is stuck, a single force F2 will be applied to that pin only, as the other pin is already free to move in the unlatching direction.

Referring again to FIGS. 4 and 5 and also to FIG. 5A, if the applied force F2 is insufficient to release the stuck pin or pins, bracket 32 preferably includes a detent mechanism 82 configured for utilizing force F2 for holding actuator 30 in the unlatching position, to allow a user to move to another location to work to free the stuck pin or pins. For instance, this can be to hammer or pry the pin or pins free, or moving to an operator cab 94 (FIG. 1) of the combine to operate a suitable control for moving the affected component, i.e., header 26, feeder 22, or both, to possibly relieve a force or loading condition causing the sticking. Detent mechanism 82 preferably utilizes a pin 84 of clevis 46 in connection with cables 38, which pin 84 is received within and slidable along a slot 86 in structure 32. Pin 84 also passes through a slot 88 through actuator 30. Slots 86 and 88 are configured and cooperate to allow movement of actuator 30 between the latching and unlatching positions, which is an arcuate motion in this embodiment, without significantly bending cables 38. Slot 86 additionally includes a detent receiver 90 (FIG. 4) for cooperatively receiving pin 84 when actuator 30 is moved to the unlatching position, and pin 84 will be yieldably held in receiver 90 by force F2, which acts to hold actuator 30 in the unlatching position. When the pin or pins 34 is or are freed, force F2 will drive the freed pin or pins in the unlatching direction, to the position shown in FIG. 10, and actuator 30 will remain lightly detained in the unlatching position by the remaining tension in the cable acting to hold pin 84 in receiver 90. Alternatively, actuator 30 can be moved from the unlatching position with the latch pin or pins still stuck, by application of a sufficient force in opposition to force F2 for removing pin 84 from receiver 90. The configuration of slots 86 and 88 facilitate this by allowing movement of pin 84 by a small amount in the direction opposite that of force F2, sufficient for passage over detent protuberances 92 located at the juncture of slot 86 and detent receiver 90.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. For instance, the actuator herein described as a manually operated device, could alternatively be a foot operated, or machine operated device, such as a mechanical, electro-mechanical, electro-hydraulic, or hydraulic actuator device. Accordingly, the following claims are intended to protect the invention broadly as well as in the specific form shown.

What is claimed is:

1. A pin latching mechanism on a feeder of an agricultural combine, comprising:
   a latch pin, and structure supporting the latch pin for movement in a latching direction, and in an unlatching direction opposite the latching direction;
   an actuator supported so as to be movable between a latching position and an unlatching position;
   an elongate cable having one end portion connected to the latch pin and an opposite end portion connected to the actuator, an intermediate portion of the cable being disposed between the latch pin and the actuator being contained and movable longitudinally within a sheath, the sheath having retainers mounted around the ends of the sheath;
   a first biasing element disposed and supported for yieldably exerting a first biasing force in the latching direction against the latch pin and against the cable for applying a tensile loading condition on the cable, and such that, when the latch pin is freely movable in the latching direction, movement of the actuator toward the latching position will allow the first biasing element to move the cable to move the latch pin in the latching direction while maintaining the tensile loading condition on the cable, and such that when the latch pin is freely movable in the unlatching direction, movement of the actuator toward the unlatching position will move the cable to move the latch pin in the unlatching direction; and
   a second biasing element disposed between a first and second leg of a bracket and supported in cooperation with the sheath such that if the latch pin is displaced in the latching direction and restrained against movement in the unlatching direction, movement of the actuator to the unlatching position will cause the second biasing element to yieldably exert a second biasing force in the unlatching direction against the sheath, the cable and the latch pin, wherein the first leg retains the second biasing element against movement toward the actuator and the second leg has openings large enough for passage of the sheath therethrough but not large enough allow the passage of the retainer therethrough, such that the second biasing member is compressed between the first and second legs to store sufficient energy for holding the retainer against the second leg during movements of the actuator between the unlatching and latching positions.

2. The mechanism of claim 1, further comprising a detent mechanism including a cable pin in connection with the cable and movable with the actuator, and a detent receiver positioned for cooperatively receiving the cable pin when the actuator is moved to the unlatching position, wherein when the actuator is moved to the unlatching position with the second biasing force exerted against the cable, the cable pin will be releasable held in the detent receiver by the second biasing force to hold the actuator in the unlatching position, the cable pin being releasable from the detent receiver by removal of the second biasing force or by application of a force against the actuator sufficient to overcome the second biasing force.

3. The mechanism of claim 1, wherein the second biasing element comprises a spring.

4. The mechanism of claim 1, wherein the first biasing element maintains the tensile loading condition on the cable during movements of the latch pin in both the latching direction and the unlatching direction.

5. The mechanism of claim 1, wherein the sheath and the second biasing element are supported such that if the latch pin is displaced in the latching direction and restrained against movement in the unlatching direction, and the actuator is moved to the unlatching position, the sheath will be moved by the movement of the actuator against the second biasing element to exert the second biasing force in the unlatching direction against the cable and the latch pin.

6. The mechanism of claim 1, wherein sheath is curved.

7. The mechanism of claim 1, wherein the actuator is manually movable between the latched position and the unlatched position.

8. The mechanism of claim 1, wherein the latch pin and the structure supporting the latch pin for movement are disposed on structure of a work machine in a position for engagement of the latch pin with a receiver on an element to be connected to the work machine.

9. The mechanism of claim 8, wherein the structure of the work machine is a feeder of an agricultural combine, and the latch pin is positioned for cooperatively engaging a latch pin receiver on a header mountable on the feeder when positioned in predetermined relation to the feeder.

10. A pin latching mechanism on a feeder of an agricultural combine, comprising:
    a latch pin, and structure supporting the latch pin on the feeder for movement in a latching direction, and in an unlatching direction opposite the latching direction:
    an actuator supported for movement between a latching position and an unlatching position, and structure configured for holding the actuator in the unlatching position;
    an elongate cable having one end portion connected to the latch pin and an opposite end portion connected to the actuator, a portion of the cable being disposed between the latch pin and the actuator being contained and movable longitudinally within a sheath;
    a first biasing element disposed and supported for yieldably exerting a first biasing force in the latching direction against the latch pin and against the cable for applying a tensile loading condition on the cable such that when the latch pin is freely movable in the latching direction, movement of the actuator toward the latching position will allow the first biasing element to move the cable to move the latch pin in the latching direction while maintaining the tensile loading condition on the cable, and such that when the latch pin is freely movable in the unlatching direction, movement of the actuator toward the unlatching position will move the cable to move the latch pin in the unlatching direction;
    a second biasing element disposed and supported in cooperation with the sheath such that if the latch pin is displaced in the latching direction and restrained against movement in the unlatching direction, holding the actuator in the unlatching position will cause the second biasing element to yieldably exert a second biasing force in the unlatching direction against the sheath, the cable and the latch pin until the latch pin is released or the actuator is moved from the unlatching position; and a detent mechanism including a cable pin in connection with the cable and movable with the actuator, the cable pin is received within and slidable along a substantially horizontal slot in the structure, and a detent receiver extending substantially perpendicularly from the slot, the detent receiver positioned for cooperatively receiving the cable pin when the actuator is moved to the unlatching position, wherein when the actuator is moved to the unlatching position with the second biasing force exerted against the cable, the cable pin will be releasable held in the detent receiver by the second biasing force to hold the actuator in the unlatching position, the cable pin being releasable from the detent receiver by removal of the second biasing force or by application of a force against the actuator sufficient to overcome the second biasing force, wherein the detent receiver further includes a detent protuberance located at the juncture of the slot and detent receiver.

11. The mechanism of claim 10, further comprising a detent mechanism including a pin in connection with the cable and movable with the actuator, and a detent receiver positioned for cooperatively receiving the pin when the actuator is moved to the unlatching position, wherein when the actuator is moved to the unlatching position with the second biasing force exerted against the cable, the pin will be releasable held in the detent receiver by the second biasing force to hold the actuator in the unlatching position, the pin being releasable from the detent receiver by removal of the second biasing force or by application of a force against the actuator sufficient to overcome the second biasing force.

12. The mechanism of claim 10, wherein the second biasing element comprises a spring.

13. The mechanism of claim 10, wherein the first biasing element maintains the tensile loading condition on the cable during movements of the latch pin in both the latching direction and the unlatching direction.

14. The mechanism of claim 10, wherein the sheath and the second biasing element are supported such that if the latch pin is displaced in the latching direction and restrained against movement in the unlatching direction, and the actuator is moved to the unlatching position, the sheath will be moved by the movement of the actuator against the second biasing element to exert the second biasing force in the unlatching direction against the cable and the latch pin.

15. The mechanism of claim 10, wherein sheath is curved.

16. The mechanism of claim 10, wherein the actuator is manually movable between the latched position and the unlatched position.

17. The mechanism of claim 10, further comprising a header mountable on the feeder, and wherein the latch pin is positioned for cooperatively engaging a receiver on the header when positioned in predetermined relation to the feeder.

18. A pin latching mechanism on a feeder of an agricultural combine, comprising:

a latch pin, and structure supporting the latch pin for movement in a latching direction, and in an unlatching direction opposite the latching direction;

an actuator supported for movement between a latching position and an unlatching position, and structure configured for releasably holding the actuator in the unlatching position;

an elongate curved cable having one end portion connected to the latch pin and an opposite end connected to the actuator, a portion of the cable being disposed between the latch pin and the actuator being contained and movable longitudinally within a sheath, the sheath having retainers mounted around the ends of the sheath;

a first biasing element disposed and supported for yieldably exerting a first biasing force in the latching direction against the latch pin and against the cable for applying a tensile loading condition on the cable, and such that, when the latch pin is freely movable in the latching direction, movement of the actuator toward the latching position will allow the first biasing element to move the cable to move the latch pin in the latching direction while maintaining the tensile loading condition on the cable, and such that when the latch pin is freely movable in the unlatching direction, movement of the actuator toward the unlatching position will move the cable to move the latch pin in the unlatching direction; and a second biasing element disposed between a first and second leg of a bracket and supported in cooperation with the sheath such that if the latch pin is displaced in the latching direction and held against movement in the unlatching direction, holding of the actuator in the unlatching position will cause the sheath to move against the second biasing element such that the second biasing element will yieldably exert a second biasing force in the unlatching direction against the sheath, the cable and the latch pin, until the latch is released, wherein the first leg retains the second biasing element against movement toward the actuator and the second leg has openings large enough for passage of the sheath therethrough but not large enough to allow the passage of the retainer therethrough, such that the second biasing member is compressed between the first and second legs to store sufficient energy for holding the retainer against the second leg during movements of the actuator between the unlatching and latching positions.

19. The mechanism of claim 18, wherein the actuator is manually movable between the latched position and the unlatched position.

20. The mechanism of claim 18, wherein at least the latch pin and the structure supporting the latch pin for movement are disposed on structure of a work machine in a position for engagement of the latch pin with a receiver on an element to be connected to the work machine.

* * * * *